May 6, 1941.　　M. J. HUNT ET AL　　2,240,779
GRAIN SEPARATOR
Filed April 29, 1939　　2 Sheets-Sheet 2
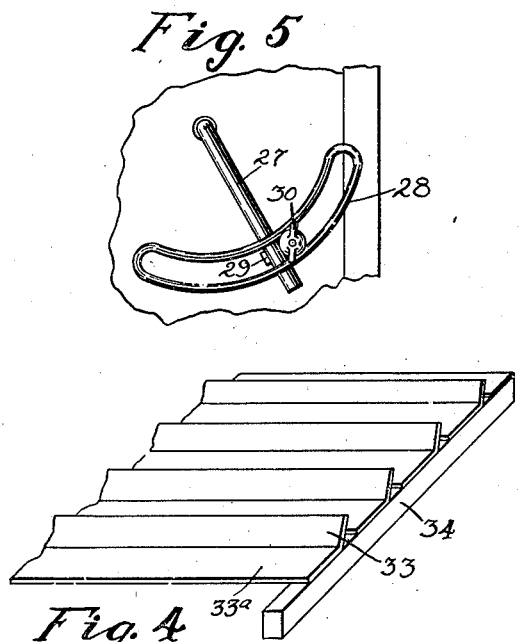
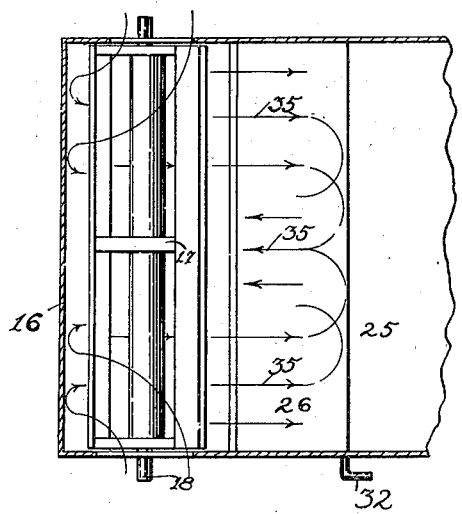
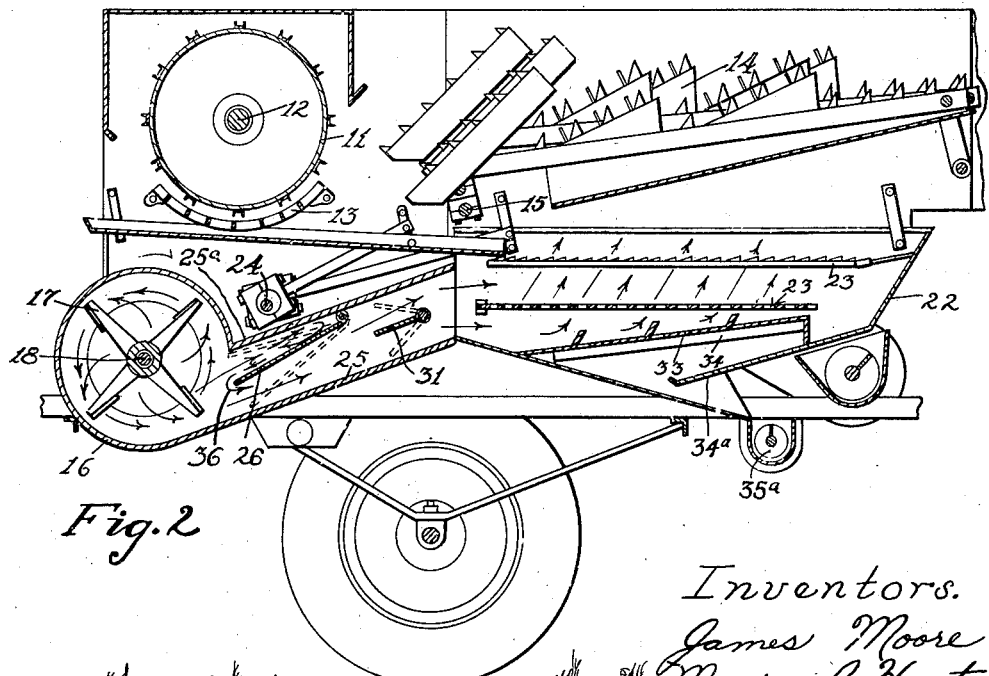
Inventors.
James Moore
Marion J. Hunt
By Orwig & Hague Att'ys Patented May 6, 1941

2,240,779

UNITED STATES PATENT OFFICE 2,240,779

GRAIN SEPARATOR

Marion J. Hunt, Peoria, and James Moore, Urbana, Ill., assignors to Wood Brothers Thresher Company, Des Moines, Iowa, a corporation of Iowa Application April 29, 1939, Serial No. 270,762

1 Claim. (Cl. 209—318)

Grain separators are usually provided with a fan for forcing currents of air upwardly through the screens for the purpose of preventing straw from lodging on the screens and thereby preventing grain from passing through the screens. These fans are usually operated in cylindrical fan housings open at their ends and of a length substantially as great as the width of the separator, and the fan housing is connected by a wide air chute with the screen housing. Due to the fact that the air enters the ends of the fan housing and is propelled by the fan through the chute, the air currents are stronger at the sides of the chute than at the center, hence, the air currents as delivered through the screens are relatively strong at the sides of the screen and relatively weak at the central portions of the screen.

Our object is to provide means of simple, durable and inexpensive construction that may be readily and easily installed in the air chutes of the ordinary grain separators and which will equalize the flow of air throughout the entire width of the air chute so that the air currents moving through the screens will be uniform throughout the entire area of the screens.

In the accompanying drawings,

Figure 2 shows a vertical central longitudinal sectional view of same;

Figure 3 shows a horizontal sectional view through the fan housing and air chute, and illustrating by arrows the path of travel of the air;

Figure 4 shows a detail perspective view illustrating the deflector for forcing the air upwardly through the screen; and Figure 5 shows a detail side elevation illustrating the means for adjustably securing the air controlling plate in various positions of its adjustment.

Figure 1:
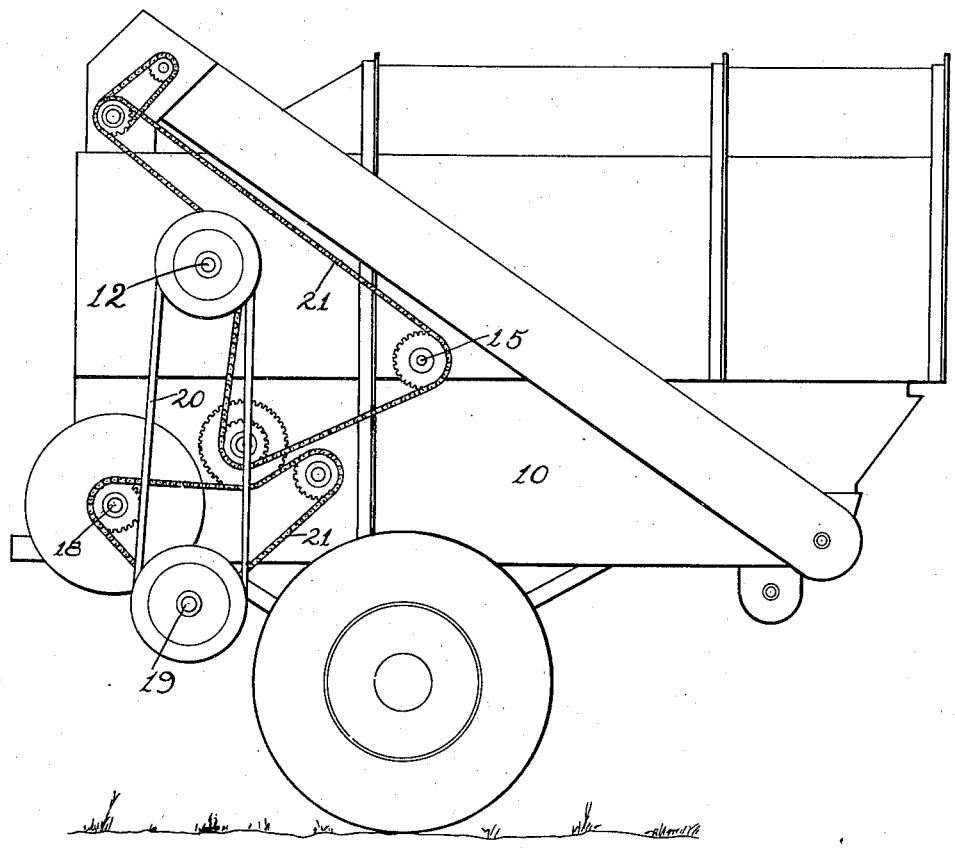
Figure 1 shows a side elevation of a threshing machine embodying our invention.

The frame of the threshing machine is indicated generally by the numeral 10. Within the frame there is the usual threshing cylinder 11 mounted on the axle 12. There is also the usual concave 13 for the cylinder. Adjacent the cylinder is the usual straw rack, indicated generally by the numeral 14, driven by the crank shaft 15. There is also the usual fan housing 16 with a fan 17 therein, driven by the shaft 18. The cylinder shaft is usually driven by a pulley. There is also a shaft 19 for driving the shaking sieves. This shaft 19 is driven from the cylinder shaft by a belt and pulley structure, indicated by the numeral 20, and the shafts 15 and 18 are driven from the cylinder shaft by means of sprocket gearing indicated generally by the reference numeral 21. This means for driving the working parts is of the usual construction.

Beneath the straw rack 14 is the screen housing 22, in which the ordinary screens 23 are mounted. The screen housing is reciprocated by a crank shaft 24 in the usual manner.

Leading from the fan housing to the screen housing 22 is a wide air chute 25 having its upper wall 25a inclined upwardly and rearwardly and within a plane passing near and preferably beneath the fan shaft 18, and pivoted to the under surface of the upper wall of the chute is an air-equalizing plate 26. This extends downwardly and toward the fan and is of a length equal to the width of the chute.

The rod 25b to which the plate 26 is fixed lies adjacent to the inner surface of the upper wall 25a and has a crank arm 27, and fixed to the machine frame adjacent this crank arm is a segmentally slotted plate 28. A hooked bolt 29 is passed around the crank arm 27 and through the slot, and is provided with a winged nut 30 for gripping against the slotted plate, thereby supporting the plate 26 in various positions of its adjustment.

Near the discharge end of the chute 25 is an air-controlling plate 31, at about the central portion vertically of the chute. This plate extends across the shoe from one side to the other, and is provided with a crank 32 on one end by which it may be adjusted to various positions.

Beneath the lower screen 23 there is a series of air-deflector blades 33 spaced apart from each other and inclined upwardly and toward the discharge end of the screen housing, each blade having a downwardly and forwardly inclined apron 33a having its free edge spaced apart from the adjacent blade 33 to form a space through which grain on the screen 23 may be delivered to a grain board 34a, the blades 33 being arranged to deflect the air currents upwardly and through the screen 23 and to create a slight vacuum back of each blade 33 and thereby cause air currents to be drawn upwardly through said spaces rather than being driven downwardly and through the grain conveyor 35a. The support 34 to which these blades are attached is inclined upwardly toward the discharge end of the screen housing, as shown in Fig. 2.

In practical use, and when the machine is in operation, air currents will be drawn into the fan housing through the open ends of the fan housing, as shown by the arrows in Fig. 3, and since the air enters the ends of the fan housing, the major portion of the air currents are forced outwardly through the chute 25 at the sides of the chute, and the flow of air through the vertical central portion of the chute is appreciably less.

With our improved air-equalizing plate 26 adjusted to the position shown by solid lines in Figure 2 a considerable portion of the air projected from the fan through the chute is directed above the plate 26; and since it cannot pass through between the plate 26 and the top of the chute, it is placed under pressure and tends to move inwardly toward the vertical center of the chute, as indicated by arrows 35 in Fig. 3. Then, when these air currents have moved toward the center of the chute they will move downwardly over the free end of the plate 26 and toward the discharge end of the chute, as indicated by the arrow 36 in Fig. 2. By adjusting the plate 26 up and down, as shown by dotted lines in Fig. 2, the proportion of the air currents passing from the fan into the chute may be increased or diminished.

The plate 31 may be adjusted, as shown by dotted lines in Fig. 2, to distribute more or less air under the lower screen.

Obviously, both of these adjustments may be made very quickly and easily while the machine is in operation, and the operator of the machine may, by observing the action of the air currents upon the materials on the screen, so adjust the air currents as to distribute them substantially uniformly throughout the entire area of each of the screens.

We claim as our invention:

In a grain separator, the combination of a cylindrical fan housing of a length substantially greater than its diameter and having air inlet openings at its ends and an air conducting chute leading from the housing and having its width substantially greater than its vertical dimension, grain separating sieves having a width substantially equal to that of the said chute, and means for equalizing the blast of air from the fan as applied to the sieves whereby the flow of air upwardly through the longitudinal central portion of the sieves will be substantially the same as that flowing upwardly through the sides of the sieves, said means comprising an air equalizing plate pivoted at the interior of the chute with the pivoted edge close to the under surface of the top of the chute and extended downwardly and toward the fan housing and having its ends adjacent the side walls of the chute to prevent the flow of air around the ends of the plate, the free edge of the plate being normally in position adjacent the vertical central portion of the chute to thereby prevent the flow of air through the upper portion of the chute, and means for adjustably securing the plate in various positions to thereby prevent the flow of air through the major portion of the chute or any less portion thereof, and whereby air currents at the sides of the chute are directed to the central portion thereof and the flow of air to the sieves be substantially equalized throughout the sieve area.

MARION J. HUNT.
JAMES MOORE.